(12) United States Patent
Pease

(10) Patent No.: US 7,693,426 B2
(45) Date of Patent: Apr. 6, 2010

(54) LASER-BASED COMMUNICATIONS WITH A REMOTE INFORMATION SOURCE

(75) Inventor: David M. Pease, Pepperell, MA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 953 days.

(21) Appl. No.: 10/739,812

(22) Filed: Dec. 18, 2003

(65) Prior Publication Data

US 2005/0135812 A1    Jun. 23, 2005

(51) Int. Cl.
    *H04B 10/00*    (2006.01)
(52) U.S. Cl. .................. 398/170; 398/168; 398/169; 359/516; 359/517; 455/603; 455/604; 455/605
(58) Field of Classification Search ............... 398/169, 398/170, 140, 168, 182, 183, 202, 79, 91, 398/128, 130, 135, 118, 115; 455/604, 605, 455/603; 359/516, 517
    See application file for complete search history.

(56) References Cited

U.S. PATENT DOCUMENTS

| 4,662,003 | A |   | 4/1987  | Eichweber ............... 455/605 |
| 5,117,301 | A | * | 5/1992  | Tsumura .................. 398/170 |
| 5,121,242 | A |   | 6/1992  | Kennedy .................. 359/152 |
| 6,137,623 | A | * | 10/2000 | Roberson et al. .......... 359/291 |
| 6,154,299 | A | * | 11/2000 | Gilbreath et al. .......... 398/170 |
| 6,233,088 | B1| * | 5/2001  | Roberson et al. .......... 359/291 |
| 6,493,123 | B1|   | 12/2002 | Mansell et al. ............ 359/169 |
| 6,624,916 | B1| * | 9/2003  | Green et al. .............. 398/169 |
| 6,721,539 | B1| * | 4/2004  | O'Brien et al. ............ 455/41.1|
| 7,054,563 | B2| * | 5/2006  | Tsumura .................. 398/169 |

FOREIGN PATENT DOCUMENTS

| GB | 2 186 457    | 8/1987  |
| GB | 2186457      | 8/1987  |
| JP | 48-59854     | 8/1973  |
| JP | 01-245791    | 9/1989  |
| JP | 01-272237    | 10/1989 |
| JP | 10-200478    | 7/1998  |
| JP | 2000-048231  | 2/2000  |

(Continued)

OTHER PUBLICATIONS

Notification Concerning Transmittal of International Preliminary Report on Patentability mailed Jun. 29, 2006 (1 page); International Preliminary Report on Patentability mailed Jun. 29, 2006 (1 page); and Written Opinion of the International Searching Authority mailed Jun. 29, 2006 (5 pages).

(Continued)

*Primary Examiner*—Hanh Phan

(57) ABSTRACT

System and techniques for transmitting information from a remote information source use a reflector for reflecting a laser beam or other light source back to its originating location. A reflector coupled to an information source receives a laser beam from a laser source. A movement of at least one surface of the reflector is controlled to modulate the laser beam, and the modulated laser beam is reflected toward the laser source. The modulated laser beam can be received by a receiver at or near the laser source to detect and decode data embedded in the modulated laser beam.

31 Claims, 5 Drawing Sheets

FOREIGN PATENT DOCUMENTS

| | | |
|---|---|---|
| JP | 2001-298420 | 10/2001 |
| JP | 2002-511204 | 9/2002 |
| JP | 2002-507759 | 12/2002 |
| JP | 2003-517620 | 5/2003 |
| WO | 9947950 | 9/1999 |
| WO | WO 99/59271 | 11/1999 |
| WO | 9966367 | 12/1999 |

OTHER PUBLICATIONS

Bruno Von Wayenburg, Noordwijk, "Europe to Test Laser Link to Moon Probe," New Scientist, May 17, 2003.

PCT International Search Report, PCT/US2004/038940, Apr. 14, 2005, 4 pages.

Notification of Transmittal of The International Search Report and The Written Opinion of the International Searching Authority of Application No. PCT/US2004/038940, mailed Apr. 21, 2005 (7 pages).

Official Communication from European Patent Office re Office Action for EPO Application No. 04816965.0-2223, mailed Jul. 16, 2008 (5 pages).

Office Action for Japanese Appln. No. 2006-545,668 filed Nov. 19, 2004 and mailed Sep. 12, 2008 (4 pages).

* cited by examiner

LASER-BASED COMMUNICATIONS WITH A REMOTE INFORMATION SOURCE

TECHNICAL FIELD

This description relates to communicating with remote information sources, and more particularly to using lasers to provide low power, high-bandwidth communications.

BACKGROUND

Current techniques of communicating with space satellites use radio transmitters on the ground to transmit signals to a satellite and transmitters on the satellite to send data back to the ground. Radio provides a low-power communications medium with limited bandwidth. To successfully communicate information from the satellite, the satellite must accurately aim the satellite's transmitter at a receiver, which is typically on Earth.

A laser beam may be used to send information from a laser transmitter to a laser receiver. The information is encoded onto the laser beam by the laser transmitter through modulation of the frequency of the laser beam. The information may be extracted from the laser beam and decoded by the laser receiver through detection of frequency changes in the laser beam. Laser beams provide a high-power, high-bandwidth communication medium.

SUMMARY

Techniques are described for transmitting information from a remote information source, such as a satellite or an environmentally isolated sensor, to a receiver. Information is transmitted by controlling movements of a corner reflector to modulate a reflection of a laser beam that originates at or near the receiver. As a result, information can be embedded in the reflection of the laser beam and can be detected by the receiver by decoding the modulated reflection.

In one general aspect, information may be transmitted from a remote information source using a reflector coupled to the information source. An outgoing laser beam is directed at the reflector by a transmitter, and a reflected laser beam reflected by the reflector is received by a receiver. The reflector reflects the outgoing laser beam to create the reflected laser beam, and the information source is operable to move the reflector to modulate the reflected laser beam.

Implementations may include one or more of the following features. For example, the reflector may be a corner reflector, and the transmitter and the receiver may be located in substantially the same location. An actuator may move the reflector to modulate the reflected laser beam, and may be controlled by a processor. A data source may produce information that is embedded in the reflected laser beam through the modulation of the reflected laser beam. The receiver may decode the information embedded in the reflected laser beam.

A decoder coupled to the information source may be operable to decode a signal embedded within the outgoing laser beam. A power source mounted on the information source may be operable to extract power from the outgoing laser beam for use by the information source.

The reflected laser beam may be dispersed as a result of environmental conditions, and the receiver may be one of multiple receivers that are each operable to receive the dispersed reflected laser from the reflector.

The transmitter may be one of multiple transmitters operable to direct an outgoing laser beam at the reflector. The reflector may reflect the outgoing laser beam from each of the transmitters to create a corresponding reflected laser beam, and the movement of the reflector by the information source may embed a modulated signal within each of the corresponding reflected laser beams. The reflector may be one of an array of reflectors coupled to the remote information source, and the outgoing laser beam may be reflected by one or more of the array of reflectors. The information source may move different reflectors within the array of reflectors to embed different modulated signals within the reflected laser beam. The reflector may embed multiple signals within the reflected laser beam by, for example, using multiple reflective surfaces that reflect the outgoing laser beam to create the reflected laser beam and individually moving each of the multiple reflective surfaces to embed the multiple signals within the reflected laser beam. The information source may include a piezoelectric device that controls movement of the reflector. The information source may be a satellite located in outer space. A fiber-optic communications protocol may be used to modulate the reflected laser beam to embed a signal within the reflected laser beam. A signal embedded within the outgoing laser beam may be detected at the remote information source, and the signal embedded within the received laser beam may be decoded.

The reflector may include a first reflective surface, a second reflective surface perpendicular to the first reflective surface, and a third reflective surface perpendicular to the first reflective surface and the second reflective surface. A data source may produce the data signal, and a processor may use the data produced by the data source to control the movement of an actuator that moves one or more of the reflective surfaces. Each of the reflective surfaces may include a corresponding dedicated actuator, and the processor may control independent movements of each of the dedicated actuators. The reflector may be one of an array of corner reflectors, and each corner reflector in the array of corner reflectors may include one or more actuators. Each actuator may move one or more reflective surface of a corresponding corner reflector. Each corner reflector in the array of corner reflectors may have a different orientation. Each actuator may impart a modulated signal within a beam of light reflected from the corresponding corner reflector and the respective modulated signals imparted by at least two of the actuators may differ.

The transmitter may be part of a base station that includes a laser for generating a laser beam, a controller for aiming the laser beam at a remote information source, a receiver for receiving the modulated, reflected laser beam, and a demodulator for demodulating the received laser beam to retrieve the selected data. The controller may cause the laser to modulate the laser beam so that the modulated laser beam includes embedded data for the remote information source. The base station may include a decoder adapted to determine a difference between the modulated, reflected laser beam received from the remote information source and the modulated laser beam generated by the laser.

The details of different implementations are set forth in the accompanying drawings and the description below. Other features will be apparent from the description and drawings, and from the claims.

DESCRIPTION OF DRAWINGS

Like reference symbols in the various drawings indicate like elements.

DETAILED DESCRIPTION

A remote information source transmits information by modulating a reflected laser beam to embed a signal within the reflected laser beam. A receiving device decodes the signal within the reflected laser beam to retrieve the information transmitted from the remote information source. Use of a reflector avoids a need at the remote information source for a power source and processing resources necessary to power, control, and aim a laser located at the remote information source. Instead, in one implementation, the remote information source may use a corner reflector to reflect a laser beam originating at a receiving location. A corner reflector is a set of reflectors having a mutually perpendicular relationship to one another (e.g., in Cartesian coordinates, reflectors are situated in the planes x=0, y=0, and z=0). A property of corner reflectors is that they reflect reflected light beams directly back toward the light source. Accordingly, a laser beam aimed at a corner reflector on a remote information source from a laser source is reflected directly back toward the laser source. The reflected laser can therefore be detected by a receiving location at substantially the same location as the laser source.

The corner reflector modulates the reflected laser beam to embed information within the laser beam. Because the corner reflector automatically reflects the laser beam in the direction of the laser source, there is no need for high-precision aiming capabilities at the remote information source. Use of the corner reflector also prevents the remote information source from having to generate a laser beam, which reduces the power requirements of the remote information source. After receiving the reflected laser beam, a detector at the receiving location decodes the reflected laser beam to extract the information from the remote information source. Because of the relatively high frequency of laser light, more information may be transferred to and from the remote information source than with conventional radio signals.

Figure 1:
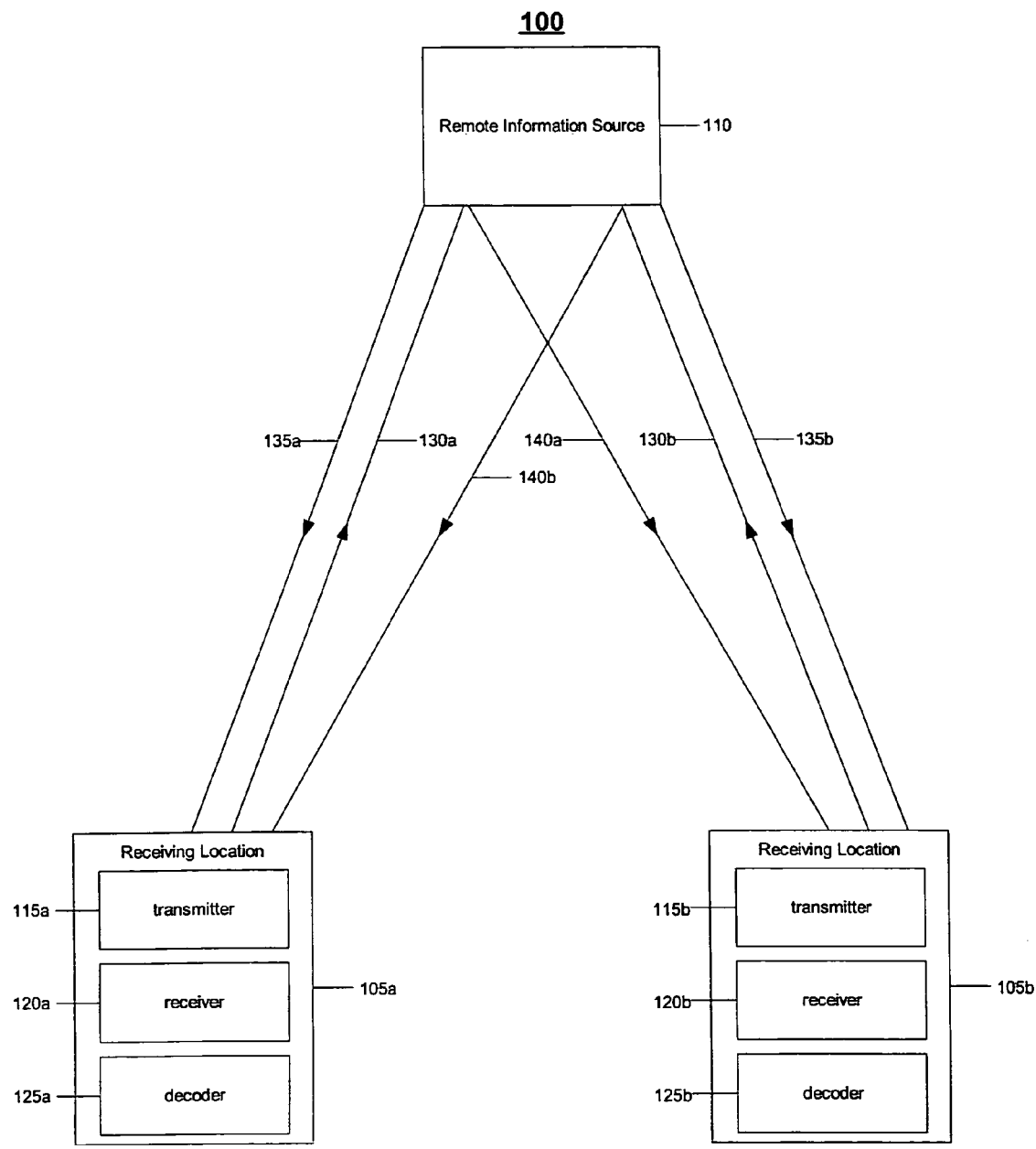
FIG. 1 is a block diagram of a system for communicating with a remote information source using lasers.

FIG. 1 is a block diagram of a communications system 100 for transmitting information between receiving locations 105a and 105b and a remote information source 110. The receiving location 105a includes a transmitter 115a, a receiver 120a, and a decoder 125a. The transmitter 115a is operable to direct an outgoing laser beam 130a at the remote information source 110. The outgoing laser beam 130a is reflected by a corner reflector at the remote information source 110 to produce a reflected laser beam 135a. The corner reflector includes three mutually perpendicular reflective surfaces that collectively form a concave corner. Laser beams that are incident on a surface of the corner reflector are reflected back in the direction from which the laser beams originated, without requiring precise orientation of the corner reflector as long as none of the three reflective surfaces faces away from the laser source (e.g., transmitter 115a). Therefore, the corner reflector reflects the outgoing laser beam 130a to send the reflected laser beam 135a back in the direction of the receiving location 105a, for a wide range of possible the orientations of the corner reflector. The reflected laser beam 135a is detected by the receiver 120a, which may be located at the same location 105a from which the outgoing laser beam 130a originated. Consequently, rather than requiring the remote information source to include systems for accurately aiming a laser beam, accurate aiming of the outgoing laser beam 130a toward the corner reflector of the remote information source may be performed at the receiving location 105a where power and control resources may be more readily or efficiently provided.

In reflecting the outgoing laser beam 130a to create the reflected laser beam 135a, the remote information source 110 modulates the corner reflector to embed a signal within the reflected laser beam 135a. The receiver 120a at the receiving location 105a receives the reflected laser beam 135a carrying information from the remote information source 110. The receiver 120a may be a telescope aimed at, and that has a line of sight to, the remote information source 110. The modulated reflected laser beam 135a, or a signal representative thereof, is passed from the receiver 120a to the decoder 125a. The decoder 125a decodes the signal from the reflected laser beam 135a to extract the information sent from the remote information source 110.

In some situations or implementations, atmospheric conditions may cause the reflected laser beam 135a to be spread out such that the reflected laser beam 135a includes a diffracted laser beam 140a that is directed toward a second receiving location 105b instead of the location 105a. As both the reflected laser beam 135a and the diffracted laser beam 140a include the embedded signal from the remote information source, information from the remote information source may be received simultaneously by multiple receiving locations 105a and 105b. Receiving information simultaneously at multiple receiving locations 105a and 105b may be beneficial when the receiving locations 105a and 105b are attempting to communicate with each other through the remote information source 110, or when the receiving locations 105a and 105b are passing control of communications with the remote information source 110 between one another. Receiving information at multiple receiving locations 105a and 105b also enables the receiving locations 105a and 105b to synchronize operations.

The second receiving location 105b may include components that are identical to those of the first receiving location 105a. Alternatively, the second receiving location 105b may include fewer or different components than the first receiving location 105a. For example, the second receiving location 105b may not include a transmitter 115b. The distance between the first receiving location 105a and the second receiving transmitter 105b may depend on the degree of diffraction for the diffracted laser beam 140a.

The first receiving location 105a may direct an outgoing laser beam 130a at the remote information source 110 at the same time that the second receiving location 105b directs an outgoing laser beam 130b at the remote information source 110. Both outgoing laser beams 130a and 130b may be reflected by the same corner reflector, so the movement of one corner reflector may embed a signal within multiple reflected laser beams that are received by multiple receiving locations. Specifically, the corner reflector may reflect the outgoing laser beam 130a to generate the reflected laser beam 135a that is received by the first receiving location 105a at the same time that the outgoing laser beam 130b is reflected to generate the reflected laser beam 135b that is received by the second receiving location 105b. Therefore, the same information from the remote information source 110 is received at multiple receiving locations 105a and 105b. Receiving the information at multiple receiving locations 105a and 105b enables the synchronization and handoff of communications with the remote information source as the receiving locations 105a and 105*b* gain and lose a line of sight with the remote information source 110. Receiving the information at multiple receiving locations 105*a* and 105*b* also creates redundancy in the information, which may avoid communications blackouts due to obstructions (e.g., cloud cover).

Figure 2:
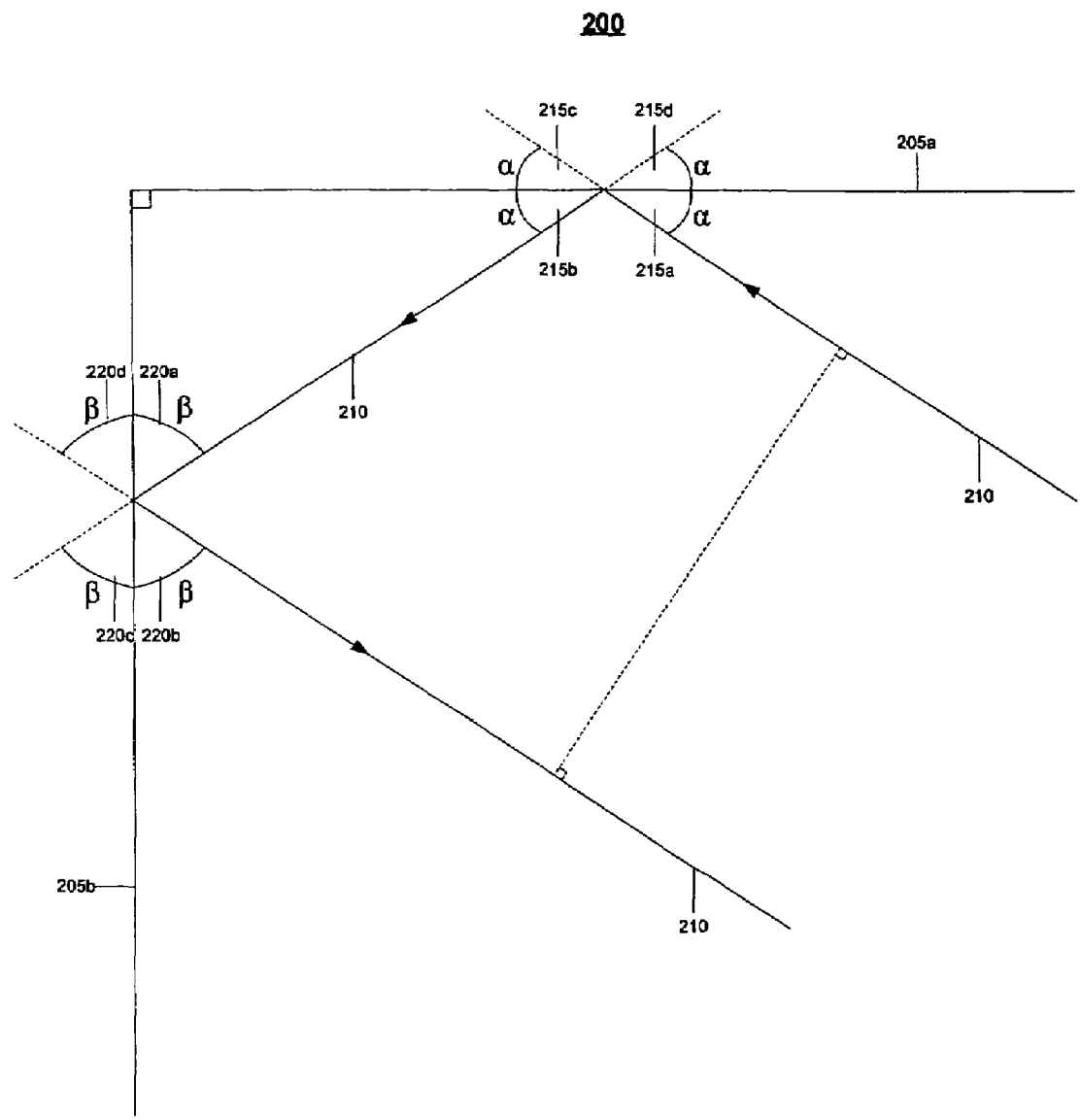
FIG. 2 is an illustration of a laser beam interacting with a two-dimensional corner reflector.

As discussed above, a remote information source in one implementation includes a three-dimensional corner reflector. Other implementations may employ a two-dimensional corner reflector. FIG. 2 illustrates the reflective properties of a two-dimensional corner reflector 200. The properties of a two-dimensional corner reflector 200 are similar to those of the three-dimensional corner reflector included on the remote information source. In particular, a two-dimensional corner reflector 200 reflects incident light in the direction of a source of the incident light in a two-dimensional environment just as a three-dimensional corner reflector reflects incident light in the direction of a light source in a three-dimensional environment.

The two-dimensional corner reflector includes reflective surfaces 205*a* and 205*b* that are perpendicular to one another. The reflective surfaces 205*a* and 205*b* are perfect reflectors that behave according to the law of reflection, which dictates that the angle of incidence of a beam equals the angle of reflection of the beam. In other words, the angle at which a laser beam approaches a reflective surface 205*a* or 205*b* is equal to the angle at which the laser beam leaves the reflective surface 205*a* or 205*b*. For example, a laser beam 210 enters the corner reflector 200 and approaches the reflective surface 205*a* at an angle 215*a* measuring a°. After encountering the reflective surface 205*a*, the laser beam 210 is reflected away from the reflective surface 205*a* at an angle 215*b*, which is equal to the angle 215*a* in accordance with the law of reflection. By the laws of geometry, an angle 215*c* is equal to the angle 215*a*, because the angles 215*a* and 215*c* are vertical angles. Similarly, an angle 215*d* is equal to the angle 215*b*, because the angles 215*b* and 215*d* are vertical angles. Therefore, all of the angles 215*a-d* measure α°. Consequently, the reflection of the laser beam 210 by the reflective surface 205*a* causes the laser beam to turn through angles 215*b* and 215*c*, for a total turn of 2α°.

After encountering the reflective surface 205*a*, the laser beam 210 moves toward the reflective surface 205*b* at an angle 220*a* measuring β°. After encountering the reflective surface 205*b*, the laser beam 210 is reflected away from the reflective surface 205*b* at an angle 220*b*, which is equal to the angle 220*a* in accordance with the law of reflection. By the laws of geometry, an angle 220*c* is equal to the angle 220*a*, because the angles 220*a* and 220*c* are vertical angles. Similarly, an angle 220*d* is equal to the angle 220*b*, because the angles 220*b* and 220*d* are vertical angles. Therefore, all of the angles 220*a-d* measure β°. Consequently, the reflection of the laser beam 210 by the reflective surface 205*b* causes the laser beam to turn through angles 220*b* and 220*c*, for a total turn of 2β°.

At this point, the laser beam 210 has encountered both reflective surfaces 205*a* and 205*b* and has turned through an angle measuring:

$$2\alpha° + 2\beta°$$

The two reflective surfaces 205*a* and 205*b* form a right triangle in conjunction with the path of the laser beam 210 between the two reflective surfaces 205*a* and 205*b*. The angles 215*b* and 220*a* are the angles of the right triangle not measuring 90°. The angle 215*b* measures α°, while angle 220*a* measures β°. Therefore:

$$\alpha° + \beta° + 90° = 180°$$

because the angles of a triangle sum to 180°. Simplifying the above equation yields:

$$\alpha° + \beta° = 90°$$

Therefore, the angle through which the laser beam 210 turns measures:

$$2\alpha° + 2\beta° = 2(\alpha° + \beta°) = 2(90°) = 180°.$$

Consequently, the laser beam 210 is reflected back in the direction from which it came. When a laser source co-located or substantially co-located with a receiving location directs a laser beam at a corner reflector on a remote information source, the laser beam is reflected back in the direction of the receiving location. The reflective surfaces of the corner reflector may be moved to embed a signal within the reflected laser beam.

Figure 3:
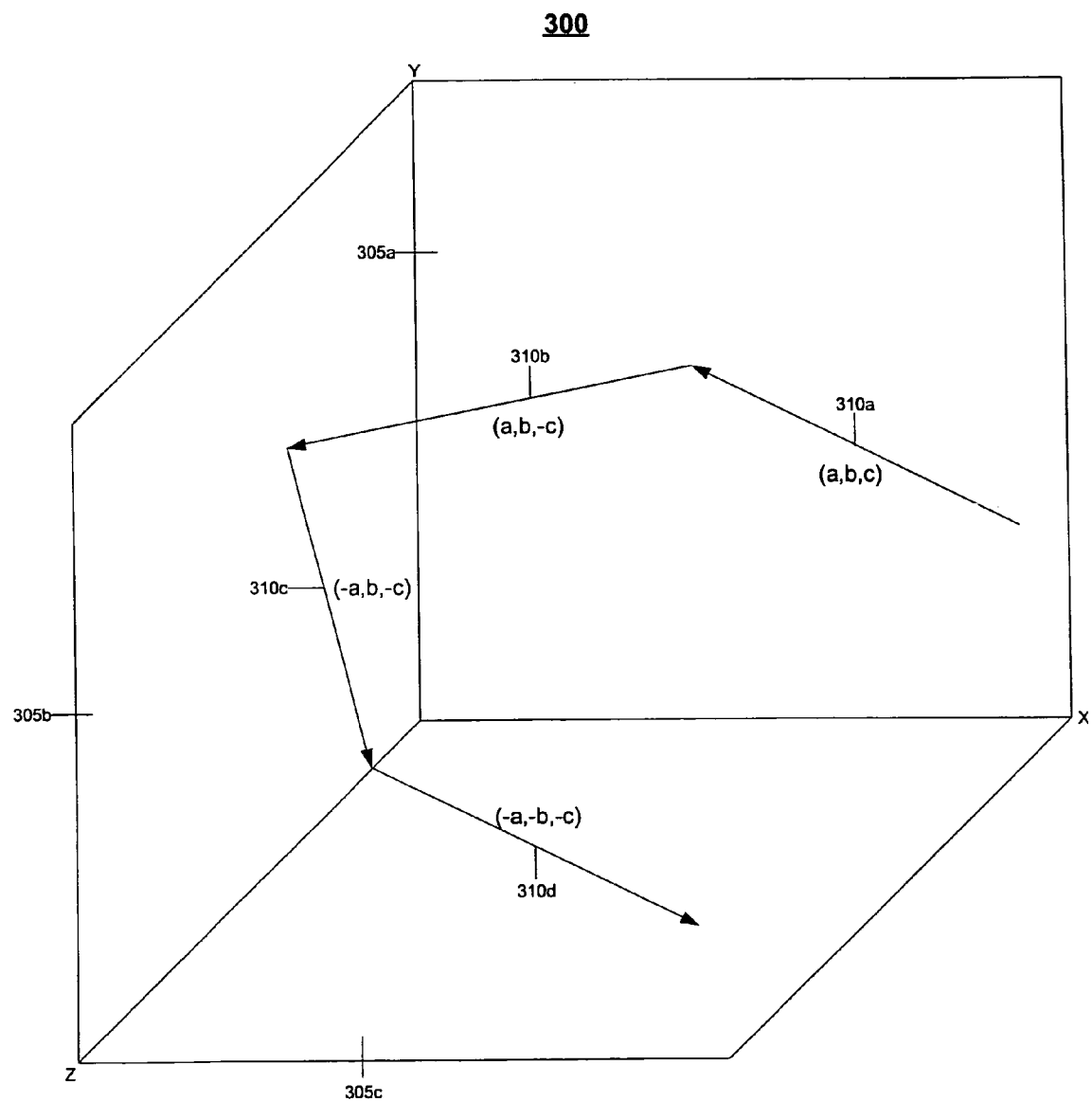
FIG. 3 is an illustration of a laser beam interacting with a three-dimensional corner reflector.

FIG. 3 is an illustration of a three-dimensional corner reflector 300 that includes reflective surfaces 305*a*, 305*b*, and 305*c* that are mutually perpendicular to one another. Like the two-dimensional corner reflector from FIG. 2, the reflective surfaces 305*a*-305*c* are perfect reflectors that behave according to the law of reflection. For ease of illustration and discussion, assume that the three-dimensional corner reflector 300 is oriented such that each of the reflective surfaces 305*a*-305*c* is perpendicular to one of the axes of the three dimensional space in which the three-dimensional corner reflector 300 is situated. For example, the reflective surface 305*a* sits in the plane defined by the X- and Y-axes and is perpendicular to the Z-axis. Likewise, the reflective surface 305*b* sits in the plane defined by the Y- and Z-axes and is perpendicular to the X-axis. Similarly, the reflective surface 305*c* sits in the plane defined by the X- and Z-axes and is perpendicular to the Y-axis.

In the example illustrated in FIG. 3, a laser beam 310*a* enters the corner reflector 300 directed along an arbitrary three-dimensional vector (a, b, c). Because of the assumed orientation of the corner reflector 300 and the law of reflection, one component of the vector defining the direction of the laser beam 310*a* will be reversed as a result of interacting with one of the reflective surfaces 305*a-c*. Specifically, the vector component corresponding to the axis of the three-dimensional space that is perpendicular to the reflective surface off of which the laser beam 310*a* is reflected is reversed. For example, the reflective surface 305*a* will cause the Z component of the direction of the laser beam 310*a* to be reversed. Likewise, the reflective surface 305*b* will cause the X component of the direction of the laser beam 310*a* to be reversed. Similarly, the reflective surface 305*c* will cause the Y component of the direction of the laser beam 310*a* to be reversed.

Specifically, the reflected laser beam 305*a* enters the corner reflector 305 in the direction of the vector (a, b, c) and first encounters the reflective surface 305*a*. As a result of interacting with the reflective surface 305*a*, the laser beam 310*a* is reflected to produce the laser beam 310*b*, which is traveling in the direction of a vector (a, b, −c). The laser beam 310*b* next encounters the reflective surface 305*b*. As a result of interacting with the reflective surface 305*b*, the laser beam 310*b* is reflected to produce the laser beam 310*c*, which is traveling in the direction of a vector (−a, b, −c). Finally, the laser beam 310*c* encounters the reflective surface 305*c*. As a result of interacting with the reflective surface 305*c*, the laser beam 310*c* is reflected to produce the laser beam 310*d*, which is traveling in the direction of a vector (−a, −b, −c). The vector (−a, −b, −c) is opposite to the vector (a, b, c), which signifies that the reflected laser beam 310*a* is traveling in a direction that is opposite to the direction at which the reflected laser beam 310d leaves the corner reflector. Therefore, the reflected laser beam 310d is traveling towards the source of the reflected laser beam 310a, regardless of the original direction in which the reflected laser beam 310a was traveling.

The orientation of the corner reflector 300 was assumed only for ease of illustration and discussion. Provided that the orientation of the corner reflector 300 is such that none of the reflective surfaces 305a-305c faces away from the reflected laser beam, the laser beam that leaves the corner reflector 300 travels in a direction that is opposite to the direction of the laser that entered the corner reflector 300. In addition, the axes of the three-dimensional space may be defined to achieve the orientation of the corner reflector 300 described above.

Because the reflective surfaces 305a-305c are not infinite in extent, it is possible in some cases that the reflected beam may not strike all three surfaces. For example, when the angle at which a laser beam 310 enters a corner reflector 300 is very small (e.g., the laser beam 310 is nearly parallel to at least one of the reflective surfaces 305a-305c), the laser beam 310 may not be reflected by all of the reflective surfaces 305a-305c of the corner reflector 300 before the laser beam 310 exits the corner reflector 300. In such a case, the laser beam 310 may not be reflected back to the source of the laser beam 310. To help ensure proper reflection in one implementation, the corner reflector 300 may be aimed generally at the source of the laser beam 310. In such an implementation, the angle at which the laser beam 310 enters the corner reflector 300 is not too shallow for the laser beam to be reflected off of all of the reflective surfaces 305a-305c. In another implementation, multiple corner reflectors 300, each with a different orientation, may be used. In such an implementation, the laser beam 310 will enter one of the corner reflectors 300 at an angle that is not too shallow for the laser beam to be reflected off of all of the reflective surfaces 305a-305c, and will be reflected back to the source of the laser beam 310.

Figure 4:
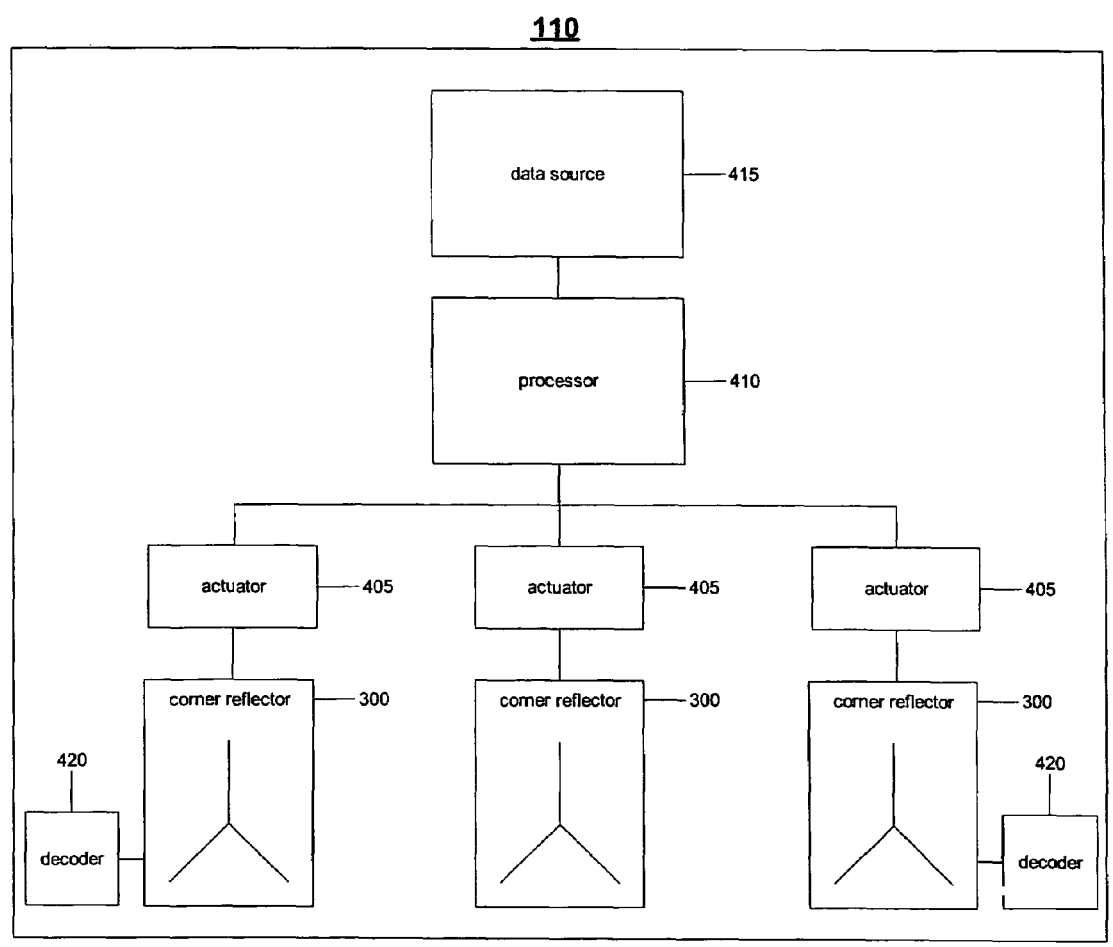
FIG. 4 is a block diagram of a remote information source operable to communicate with reflected lasers.

FIG. 4 is a block diagram of a remote information source 110 that gathers information to be sent to a receiving location. The remote information source includes three corner reflectors 300 that reflect a laser beam sent from the receiving location back to the receiving location. Each corner reflector 300 is moved by an actuator 405 to modulate the laser beam reflected by the corner reflectors 300 and to embed a signal within the reflected laser beam. A processor 410 controls the movement of the actuators 405 based on information received from a data source 415.

In one implementation, the remote information source 110 may be a space-based satellite. In another implementation, the remote information source 110 may be a sensor in a location with limited power or in a location that is not easily accessible due to environmental conditions (e.g., on an active volcano).

In one implementation, moving one or more of the reflective surfaces of the corner reflector 300 embeds a signal within the reflected laser beam. In addition, multiple reflective surfaces of the corner reflector may be moved to encode multiple signals onto the reflected laser beam. For example, each reflective surface may embed a separate signal such that three different signals can be embedded into the reflected laser beam at the same time. Moving one or more of the reflective surfaces of the corner reflector 300 changes the distance that a laser beam travels within the corner reflector 300. The changes in distance cause changes in frequency of the laser beam reflected by the corner reflector. Controlled movements of the corner reflector can therefore be used to modulate the reflected laser beam. More specifically, controlling the motion of the reflective surfaces of the corner reflector 300 causes controlled changes of frequency, and these frequency changes represent information to be sent from the remote information source to be embedded in the reflected laser beam. The changes in frequency may be detected and decoded by the receiving location to extract the information from the reflected laser beam. For example, the changes in frequency may be introduced into and read from the reflected laser beam according to a known communications protocol, such as a fiber optic communications protocol or any other suitable protocol.

In one implementation, an actuator 405 may be used to move the one or more reflective surfaces of the corner reflector to generate a modulated signal. The actuator 405 may control all of the reflective surfaces of the corner reflector 300 that are to be moved, or there may be a dedicated actuator 405 for each of the reflective surfaces that is to be moved. The actuator 405 may be a piezoelectric device that moves upon application of an electric charge. Controlled application of electric charges may cause the reflective surfaces to move so as to embed a signal within the reflected laser beam. Movement of the reflective surfaces is typically in two dimensions (i.e., back and forth) in a direction that is perpendicular to one of the surfaces or at an angle to one or more of the surfaces. The reflective surfaces may also be independently rotated (i.e., so that they are not precisely perpendicular to one another, in which case the path of the reflected laser beam is changed, which may require the receiving location to cover a broad enough area to account for the change in path).

The motion of the reflective surfaces of the corner reflector 300 is controlled by a processor 410. The processor 410 signals the actuator 405 to move the reflective surfaces of the corner reflector 300 to embed information within the reflected laser beam. The information to be embedded within the reflected laser beam may be produced by a data source 415. The processor 410 may use the information from the data source 415 to govern when the reflective surfaces of the corner reflector 300 are moved. The data source 415 may be a memory operable to store information, or it may be a device capable of detecting or producing information (e.g., a sensor). The data source 415 also may store other information or instructions necessary for the operation of the remote information source 110. In some cases, the data source may be a mechanical device that detects environmental conditions, for example, and controls movement of the corner reflector through the processor 410 or directly (i.e., without using the processor 410). In the latter case, the data source 415 and the actuator 405 may be combined in a single device.

In one implementation, the laser beam to be reflected by the remote information source 110 may include information for use by the remote information source. The remote information source 110 may include a decoder 420 that decodes the information embedded within the laser beam sent to the remote information source. A detector (not shown) on the corner reflector may detect the laser beam reflected by the corner reflector 300. For example, the detector may be located behind the corner reflector with the reflective surfaces of the reflector having one-way reflectivity such that the laser beam is partially reflected and partially transmitted. Alternatively, the detector may be located adjacent to the corner reflector and may rely upon a slight diffraction of the laser beam to permit detection. The detector may pass a signal indicative of the laser beam to a decoder 420, which decodes the signal. As an alternative, one of the reflectors may include the decoder 420. The decoder 420 may send the information decoded from the signal to the processor 410 for use by the remote information source 110. For example, the information may include operating instructions for the remote information source 110.

When the receiving location receives the reflected laser beam that originally included encoded information, the original encoded information is subtracted from the signal included in the reflected laser beam to identify the information sent from the remote information source 110. In an alternative implementation, to decrease the amount of equipment and processing resources needed on the remote information source 110, information may be sent to the remote information source 110 using radio waves such that the remote information source 110 does not need to detect and decode the laser beam in addition to modulating the laser beam.

In another implementation, the remote information source 110 includes an array of corner reflectors 300. For example, the remote information source 110 may include a 10×10 array of corner reflectors 300. The corner reflectors 300 in the array may be oriented in a variety of different directions. Including multiple corner reflectors 300 with different orientations on the remote information sources 10 enables information to be sent from the remote information source 110 regardless of the orientation of the remote information source 110 or, in other words, regardless of the angle of incidence of the reflected laser beam. The various corner reflectors 300 may be controlled to impart the same information to all of the laser beams reflected by the corner reflector. As a result, a reflected laser beam may include the same modulated information regardless of which corner reflector in the array reflected the beam.

With an array of corner reflectors 300 distributed over the remote information source 110, a laser beam sent by a receiving location to the remote information source 110 will encounter at least one corner reflector 300. As a result, the remote information source 110 does not need to use power or control resources to orient a corner reflector 300 so that the corner reflector 300 may reflect the laser beam sent from the receiving location, and does not need to have control systems for doing so. When a line of sight exists, the receiving location may send a laser beam to be reflected by a corner reflector 300 located on the visible side of the remote information source 110. In addition, or as an alternative, multiple corner reflectors may have the same orientation. As a result, if the laser beam sent from the receiving location is spread out or if multiple highly accurate laser beams are sent from the receiving location, the laser beam or beams may be reflected by multiple corner reflectors 300. Each of the corner reflectors 300 may embed a different signal within each reflected laser beam sent back to the receiving location, thus sending multiple different signals containing information from the remote information source 110 to the receiving location.

In other implementations, the remote information source 110 may be powered by the laser beam sent from the receiving location. The remote information source 10 may extract power from the laser beam in addition to embedding a signal within the laser beam reflected back to the receiving location. The extracted power may support the operation of the remote information source 110. For example, the extracted power may be used to drive the actuator 405 to embed a signal within the reflected laser beam. The extracted power also may be used to power the processor 410 and/or the data source 415.

Figure 5:
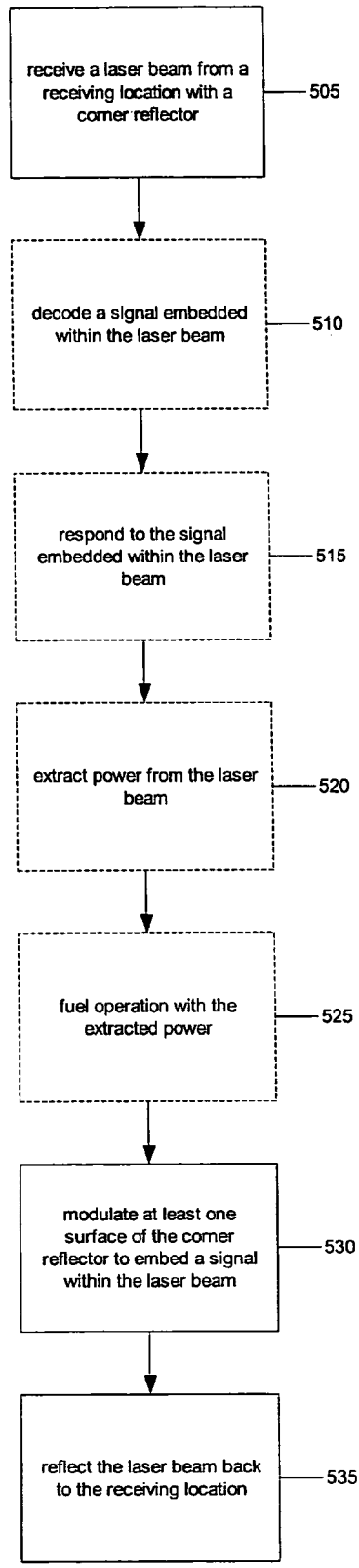
FIG. 5 is a flow chart of a process for communicating with reflected lasers.

FIG. 5 is a flow diagram of a process 500 that is used by a remote information source to send information back to a receiving location while minimizing the amount of power spent and increasing the amount of transferred information. The process 500 includes receiving a laser beam from a receiving location with a corner reflector (step 505). The laser beam may include an encoded signal, and the signal may be decoded from the laser beam (step 510). The remote information source may appropriately respond to the signal decoded from the laser beam (step 515). For example, the signal embedded within the laser beam may include instructions to be executed by the remote information source, and responding to the embedded signal may include executing the instructions. As another example, the embedded signal may include information to be stored by the remote information source, and responding to the embedded signal may include storing the information from the embedded signal.

The remote information source also may extract power from the laser beam (step 520). The extracted power may be used to fuel the operation of the remote information source (step 525). For example, the power may be used to operate the components that embed a signal within the reflected laser beam, or the power may be used to operate other parts of the remote information source.

The remote information source modulates at least one of the reflective surfaces of the corner reflector to embed a signal within the reflected laser beam such that the reflected laser beam contains information to be sent from the remote information source (step 530). Alternatively or additionally, the multiple surfaces of the corner reflector may be modulated to embed multiple signals within the reflected laser. The laser beam with one or more embedded signals is then reflected back to the receiving location, where the signals are decoded to extract the information sent from the remote information source (step 535).

A number of implementations have been described. Nevertheless, it will be understood that various modifications may be made. For example, the steps of the described processes may be rearranged. Accordingly, other implementations are within the scope of the following claims.

What is claimed is:

1. A system for transmitting information from an information source, the system comprising:
a plurality of reflectors to be coupled to the information source; and
actuators associated with corresponding ones of the reflectors, the actuators configured to move the corresponding reflectors to frequency modulate different signals on a same laser beam by varying a distance traveled by the laser beam between a transmitter and a receiver, each of the signals frequency modulated by a different one of the reflectors;
wherein the reflectors are arranged to receive the laser beam having a frequency from the transmitter that is remote from the system; and
each of the reflectors to reflect a corresponding frequency-modulated laser beam to the receiver that is remote from the system.

2. The system of claim 1 wherein each of the reflectors is a corner reflector.

3. The system of claim 1 further comprising a processor configured to signal the actuators to control movement of the reflectors to frequency modulate the different signals on the laser beam.

4. The system of claim 1 further comprising a data source that produces information, wherein the modulation of the reflected laser beam from at least one of the reflectors embeds the information in the reflected laser beam.

5. The system of claim 1 further comprising a decoder to be coupled to the information source, wherein the decoder is configured to decode a signal embedded within the laser beam received from the transmitter.

6. The system of claim 1 further comprising a power source to be mounted on the information source, wherein the power source is operable to extract power from the laser beam received from the transmitter for use by the information source.

7. The system of claim 1 wherein:
the reflected laser beam from at least one of the reflectors is dispersed as a result of environmental conditions;
wherein the dispersed reflected laser beam is receivable by at least one of a plurality of receivers that are remote from the system.

8. The system of claim 1 wherein the reflectors make up an array of reflectors.

9. The system of claim 1 wherein at least one of the reflectors includes multiple reflective surfaces,
wherein the laser beam is reflected by the multiple reflective surfaces to create a corresponding reflected laser beam
wherein the multiple reflective surfaces are moveable individually to embed multiple signals within the corresponding reflected laser beam.

10. The system of claim 1 wherein each of the actuators includes a piezoelectric device that controls movement of the corresponding reflector.

11. The system of claim 1 wherein the information source comprises a satellite located in outer space.

12. The system of claim 1 wherein a fiber-optic communications protocol is used to modulate the reflected laser beam from at least one of the reflectors to embed a signal within the reflected laser beam.

13. The system of claim 1, wherein the reflectors are moved by different amounts to provide different distances traveled by the laser beam through the corresponding reflectors.

14. A method for sending information from a remote information source, the method comprising:
receiving a laser beam from a laser source at a corner reflector, the laser beam having a frequency;
controlling movement of a plurality of surfaces of the corner reflector to vary the distance traveled by the laser beam between the laser source and the plurality of surfaces so as to frequency modulate different signals on the laser beam, each signal modulated by a different surface; and
reflecting the modulated laser beam toward the laser source using the corner reflector.

15. The method of claim 14 further comprising:
detecting a signal embedded within the received laser beam at the remote information source; and
decoding the signal embedded within the received laser beam.

16. The method of claim 14 wherein:
the reflected laser beam is received by a receiver at substantially the same location as the laser source; and
a modulated signal within the reflected laser beam is decoded by the receiver.

17. The method of claim 14 further comprising extracting power from the laser beam.

18. The method of claim 14, wherein the corner reflector is at the remote information source, and the laser source is located at a location remote from the remote information source.

19. The method of claim 14, wherein controlling movement of the plurality of surfaces of the corner reflector comprises individually and independently controlling movement of the plurality of surfaces.

20. The method of claim 19, wherein controlling movement of the plurality of surfaces comprises controlling movement using a plurality of corresponding actuators.

21. An apparatus comprising
a first reflective surface:
a second reflective surface perpendicular to the first reflective surface;
a third reflective surface perpendicular to the first reflective surface and the second reflective surface; and
actuators operable to move the first reflective surface, the second reflective surface, and the third reflective surface to frequency modulate different signals on light incident on the reflective surfaces by varying a distance traveled by the light between a transmitter and a receiver, wherein the light is modulated in accordance with data signals.

22. The apparatus of claim 21 further comprising:
a data source operable to produce the data signals, and
a processor configured to use the data signals produced by the data source to signal the actuators to control the movement of the first, second, and third reflective surfaces.

23. The apparatus of claim 21 wherein:
each of the reflective surfaces includes a corresponding dedicated actuator; and
a processor is configured to independently control each of the dedicated actuators to independently control movement of the corresponding first, second, and third reflective surfaces.

24. The apparatus of claim 21 wherein the three reflective surfaces define a corner reflector, the apparatus further comprising:
an array of corner reflectors.

25. The apparatus of claim 24 wherein each corner reflector in the array of corner reflectors has a different orientation.

26. The apparatus of claim 24 wherein each particular actuator is operable to impart a modulated signal within a beam of light reflected from the corner reflector that corresponds to the particular actuator and the respective modulated signals imparted by at least two of the actuators differ.

27. The apparatus of claim 21 further comprising a data storage medium operable to store data included in the data signals.

28. A base station comprising:
a laser configured to generate a laser beam having a frequency;
a receiver;
a controller configured to aim the laser beam at a remote information source that includes a plurality of reflectors arranged to reflect the laser beam and to move the reflectors using corresponding actuators to frequency modulate different signals on the laser beam by varying the distance traveled by the laser beam between the laser and the receiver, wherein the laser beam is frequency modulated in accordance with selected data;
wherein the receiver is configured to receive the modulated, reflected laser beam; and
a demodulator configured to demodulate the received laser beam to retrieve the selected data.

29. The base station of claim 28 wherein each of the reflectors comprises a corner reflector.

30. The base station of claim 28 wherein the controller is further configured to cause the laser to modulate the laser beam, wherein the modulated laser beam includes embedded data for the remote information source.

31. The base station of claim 30 further comprising a decoder configured to determine a difference between the modulated, reflected laser beam received from the remote information source and the modulated laser beam generated by the laser.

* * * * *